(12) United States Patent
Robert et al.

(10) Patent No.: US 8,045,640 B2
(45) Date of Patent: Oct. 25, 2011

(54) TWO-LEVEL DEMODULATION METHOD AND DEVICE

(75) Inventors: Gérard Robert, Poisat (FR); François Dehmas, Meylan (FR); Elisabeth Crochon, Poisat (FR); Jacques Reverdy, Crolles (FR)

(73) Assignee: Commissariat A l'Energie Atomique, Paris (FR)

( * ) Notice: Subject to any disclaimer, the term of this patent is extended or adjusted under 35 U.S.C. 154(b) by 677 days.

(21) Appl. No.: 11/386,552

(22) Filed: Mar. 21, 2006

(65) Prior Publication Data

US 2006/0221477 A1 Oct. 5, 2006

(30) Foreign Application Priority Data

Mar. 21, 2005 (FR) ...................................... 05 50726

(51) Int. Cl.
*H04L 25/34* (2006.01)
(52) U.S. Cl. ........... 375/286; 235/435; 329/311; 360/29
(58) Field of Classification Search .................... 360/29; 375/286, 320; 329/311; 235/435, 492; 455/41.1
See application file for complete search history.

(56) References Cited

U.S. PATENT DOCUMENTS

| 4,431,868 | A | * | 2/1984 | Bolus et al. | ............... 379/375.01 |
| 4,967,159 | A | * | 10/1990 | Manes | ........................... 324/650 |
| 5,825,243 | A | | 10/1998 | Sato et al. | |
| 6,173,018 | B1 | | 1/2001 | Kuroki | |
| 6,400,767 | B1 | * | 6/2002 | Nuber et al. | ............. 375/240.26 |
| 2004/0066227 | A1 | * | 4/2004 | Kupnik et al. | ................. 329/347 |
| 2004/0179510 | A1 | * | 9/2004 | Kuffner et al. | ................ 370/350 |
| 2004/0199858 | A1 | * | 10/2004 | Becker et al. | ................. 714/795 |
| 2004/0233043 | A1 | * | 11/2004 | Yazawa et al. | .............. 340/10.3 |
| 2005/0105643 | A1 | * | 5/2005 | Fitch et al. | .................... 375/303 |
| 2005/0162145 | A1 | * | 7/2005 | Smith et al. | .................... 323/312 |
| 2006/0281405 | A1 | | 12/2006 | Villard et al. | |

FOREIGN PATENT DOCUMENTS

| FR | 2 747 253 A1 | 4/1996 |
| FR | 2 776 781 A1 | 3/1998 |
| FR | 0310928 | 5/2003 |
| FR | 2 859 842 A1 | 9/2003 |
| FR | 2853479 A1 | 10/2004 |
| GB | 2 379 845 A | 3/2003 |
| GB | 2379845 A | * | 3/2003 |
| JP | 04-119742 | 4/1992 |
| JP | 07123121 | 12/1995 |
| JP | 2007-506320 | 3/2007 |
| WO | 2005/029726 | 3/2005 |

OTHER PUBLICATIONS

International Preliminary Report, EPO Form 1503, dated Nov. 16, 2005.
Japanese Office Action in Japanese Application No. 2006-078114, dated Nov. 9, 2010.

* cited by examiner

*Primary Examiner* — David C Payne
*Assistant Examiner* — Leon-Viet Nguyen
(74) *Attorney, Agent, or Firm* — Nixon Peabody LLP

(57) ABSTRACT

The invention relates to a method for demodulating information emitted by amplitude modulation with two levels by a reader (2) to a transponder (4), comprising a step to determine if this symbol is identical to or is different from the previous symbol, after each symbol.

15 Claims, 5 Drawing Sheets

TWO-LEVEL DEMODULATION METHOD AND DEVICE

CROSS-REFERENCE TO RELATED APPLICATION

This application claims priority to French Application No. 05 50726, filed on Mar. 21, 2005, entitled: "Two-Level Demodulation Method and Device" by Gerard Robert, Francois Dehmas, Elisabeth Crochon and Jacques Reverdy and was not published in English.

TECHNICAL DOMAIN AND PRIOR ART

The invention relates to techniques for information exchanges between a fixed station (reader) and a contactless transponder (card, label) placed in the electromagnetic field emitted by the reader.

More precisely, the invention relates to a method of demodulating the modulation emitted by the reader, in the transponder.

As illustrated in FIG. 1A, a reader 2 emits a radio frequency magnetic field, this field is used firstly by a transponder 4 to create its power supply voltage and secondly to exchange information. Conventionally, the reader 2 sends its information by amplitude modulation of this magnetic field (Amplitude Shift Keying or ASK).

FIG. 1B shows the field emitted by a fixed station as a function of the value of the bit that it wants to transmit.

The flow rate of information exchanged between the fixed station 2 and the transponder 4 can be increased either by increasing the frequency of the modulating signal, or increasing the number of modulation amplitude levels.

Patent application No. 03 10928, not published on the date on which this application was submitted, describes a multi-level demodulation method using a single-bit analogue-digital converter with a high time resolution.

FIGS. 2A-2C briefly summarize operation of this single-bit converter defined in document No. FR 03 10928. In these figures:

H represents the field modulated by the reader (FIG. 2A),
$V_c$ is the control voltage supplied by the transponder 4 integrator (FIG. 2B), the amplitude of this voltage is representative of the amplitude level of the magnetic field H and therefore the data to be transmitted;
$S(V_c)$ is the sign of the variation of the control voltage $V_c$ of a regulation loop of the transponder (FIG. 2C).

The sign signal $S(V_c)$ is the signal used to find information emitted by the fixed station 2.

In this method, the direction of variation of the slaving voltage of an analogue/digital converter is used (demodulator of the transponder 4) to determine the modulation level.

For a two-level modulation, the problem arises of finding a modulation method capable of simply returning to the initial information.

PRESENTATION OF THE INVENTION

The invention proposes a method for demodulating this signal, in the case in which the number of levels N is equal to 2.

The invention relates firstly to a method for demodulating information emitted by two-level amplitude modulation by a reader to a transponder, comprising a step to determine if this symbol is identical to or different from the previous symbol, after each symbol.

The invention uses the fact there are only two possible levels: during the symbol time, either slaving has changed, or it has not changed. This change is detected by checking the hold time of the direction of variation.

Furthermore, the hold time of the sign of the variation of a slaving voltage of the transponder is compared with a threshold value.

Therefore the invention also relates to a method and a device in which the hold time of the sign of the variation of a slaving voltage of the transponder is compared with a threshold value.

the invention also relates to a method for demodulating information emitted by amplitude modulation with two levels by a reader to a transponder, comprising means of determining if this symbol is identical to or different from the previous symbol, after each symbol.

According to one embodiment, means are used to compare the hold time of the sign of the variation of a slaving voltage of the transponder with a threshold value.

Means may be provided to form an antenna, load impedance means at the antenna terminals, and means forming a voltage regulation loop at the terminals of the load impedance.

The means forming regulation comprise means of rectifying the voltage at the antenna terminals, and control means to modify the impedance as a function of the output from the rectification means.

Demodulation means may also comprise analogue-digital conversion means between the control means and the rectification means.

DETAILED PRESENTATION OF PARTICULAR EMBODIMENTS

Figure 1A:
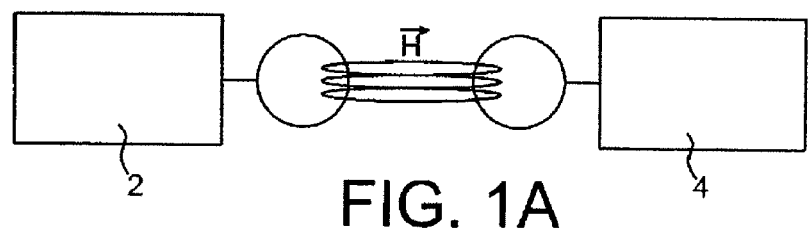
FIGS. 1A and 1B represent a reader—transponder system and the field emitted by a fixed station as a function of the value of the bit that it wants to transmit.
Figure 1B:
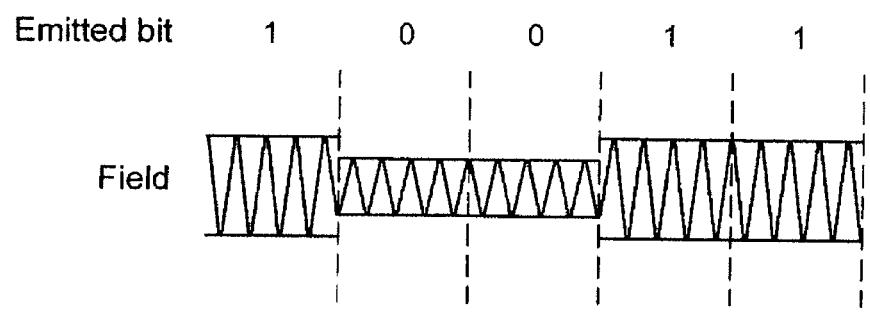
Figure 2A:
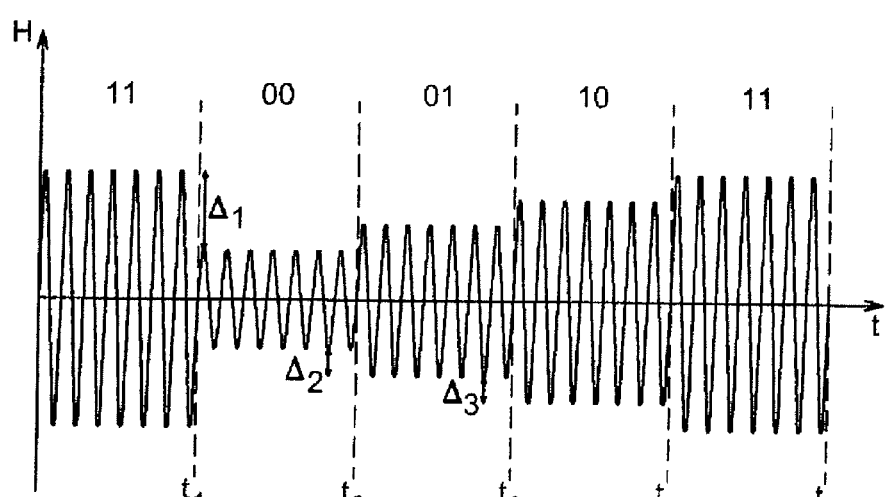
FIGS. 2A-2C illustrate a demodulation technique.
Figure 2B:
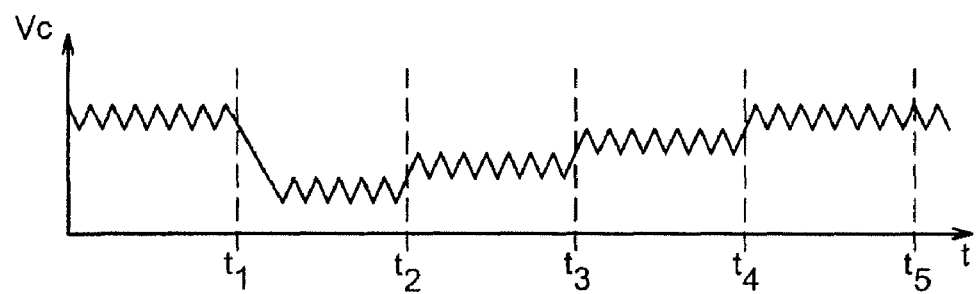
Figure 2C:
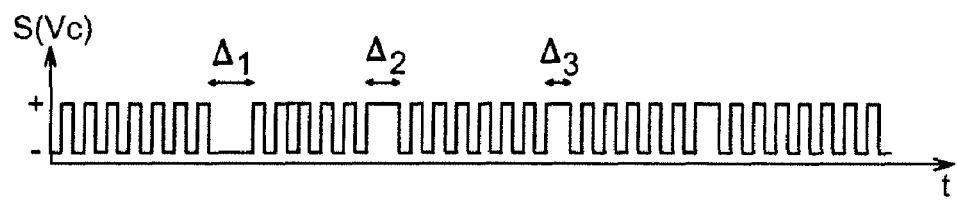

Note that the following vocabulary will be used to make the description clearer:

symbols used: the number of symbols is related to the number of bits emitted simultaneously by the base station 2 (FIG. 1A); if this number of bits is N, $2^N$ different symbols will be necessary.

the modulation level is the peak value of the electromagnetic field emitted by the reader 2. There must be at least one modulation level for each different symbol. The modulation level is coded from $(2^N-1)$ to 0.

the duration of a symbol is the transfer time of a symbol between the reader and the transponder.

Figure 3A:
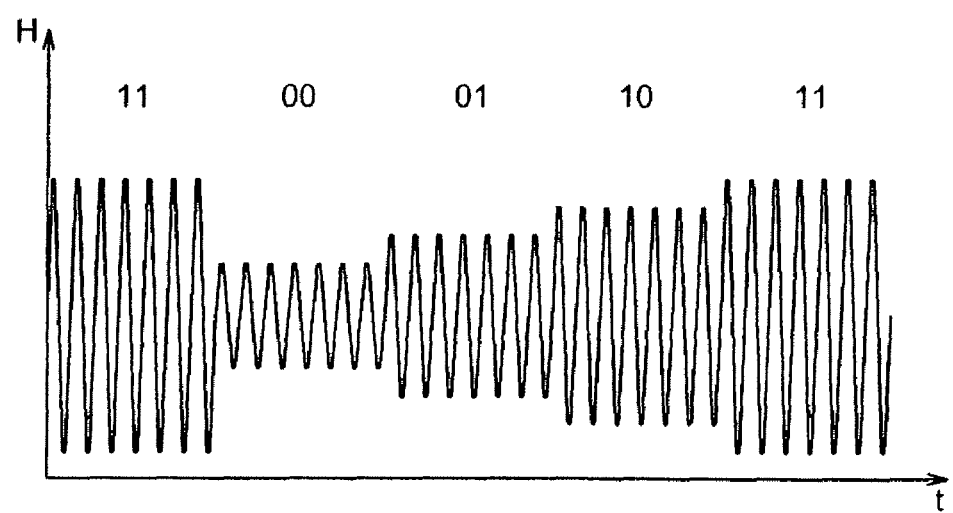
FIGS. 3A and 3B illustrate a sequence of symbols and corresponding modulation levels.
Figure 3B:
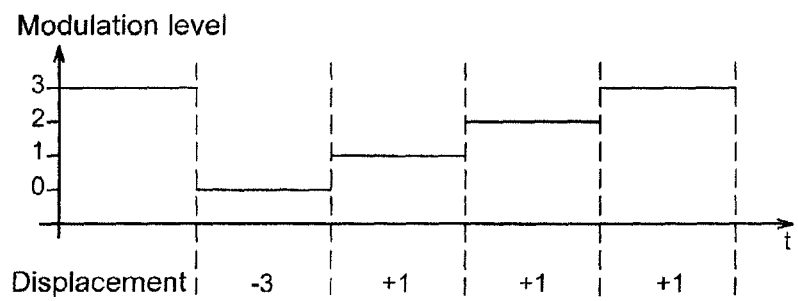

FIGS. 3A and 3B illustrate these reminders for a symbol composed of 2 bits; four different modulation levels are then used.

2 modulation levels are sufficient in the case in which the number of bits per symbol is 1.

In this case, there is no constraint on the control velocity of the transponder regulation loop since it is not essential that the regulation loop has reached the set value, unlike the case in which the number of bits per symbol is greater than 1.

Two possible cases can arise at the end of a symbol time:

a) The symbol at time t(n+1) is different from the symbol at time t(n); in this case, the regulation loop acts, the sign of the variation of this loop is stable for a time θ and the duration of an identical sign sequence is greater than a threshold value; for example 500 ns or:

b) the symbol at time t(n+1) is equal to the symbol at time t(n); either the voltage regulation loop has reached equilibrium during the symbol Tn and there is an alternation of sequences from 0 and 1 bits for a duration less than the threshold value, or the loop continues to act and the current sign sequence for Tn is extended (for example 500 ms).

Figure 7:
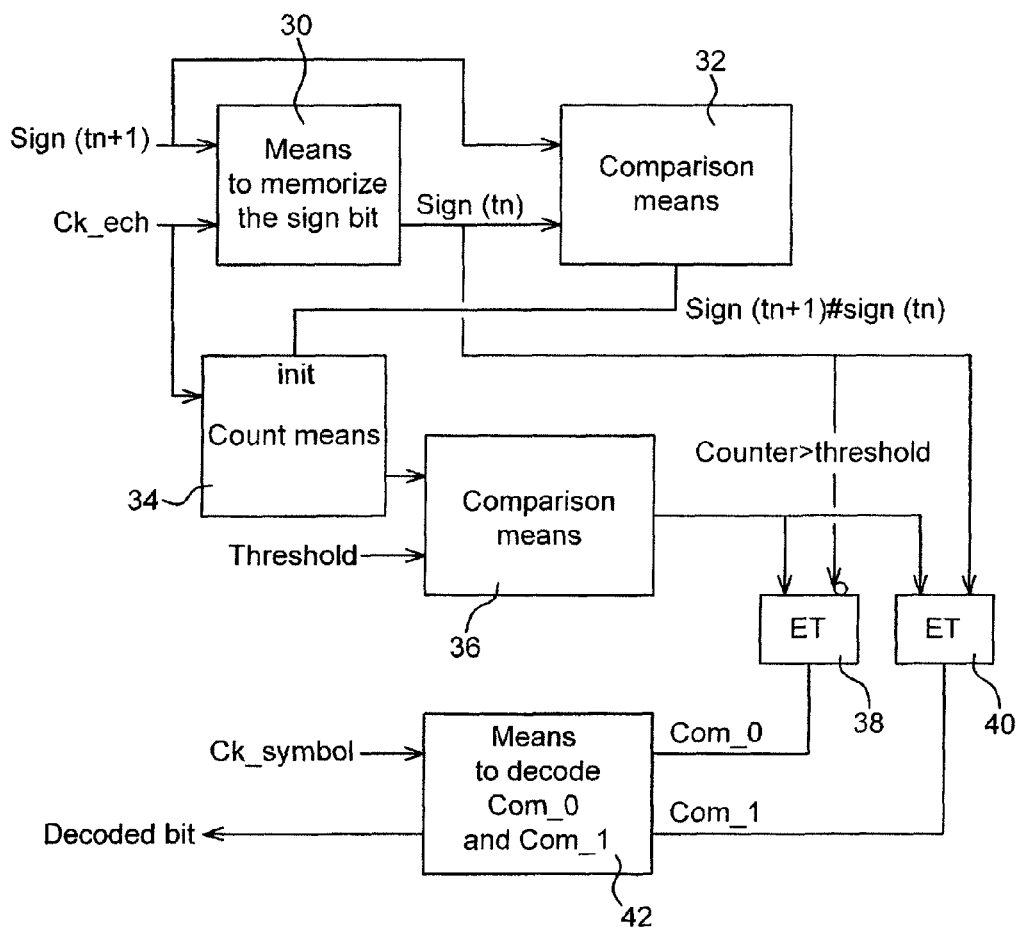
FIG. 7 represents an embodiment of a device according to the invention.

A method according to the invention can be implemented digitally in a transponder, for example using a microprocessor that processes the received signals, or dedicated electronics such as that shown in FIG. 7.

Figure 4:
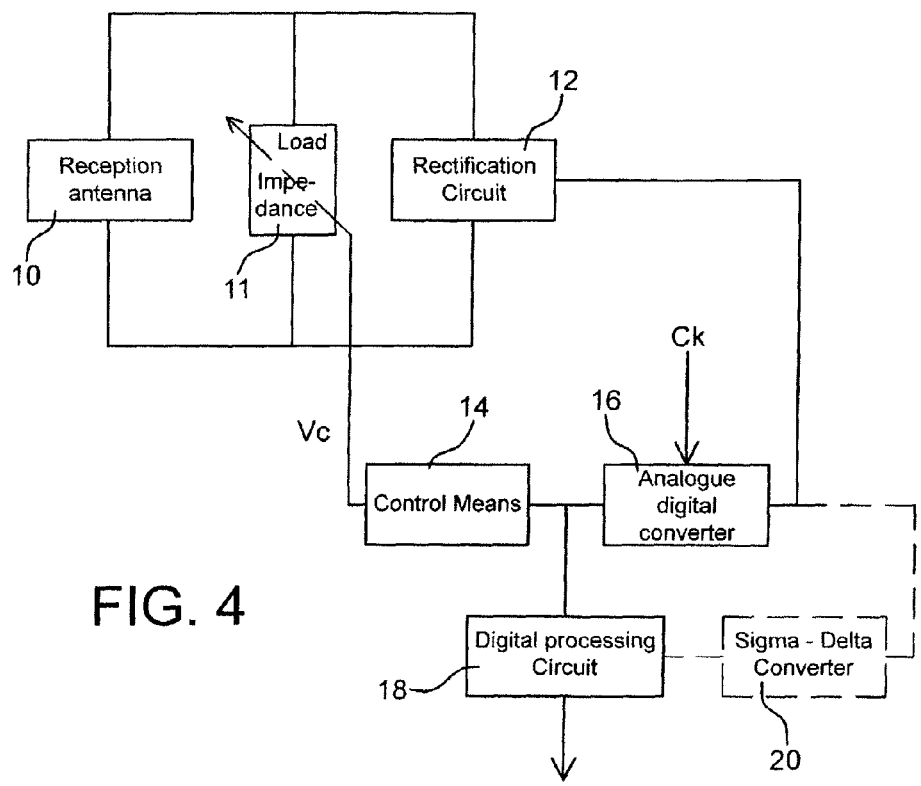
FIG. 4 represents a device according to the invention.

FIG. 4 shows part of the transponder device 4 comprising means 10 forming a reception antenna, means 12 forming a rectification circuit, means 16 forming an analogue—digital converter and control means 14.

These control means produce a control voltage of a load impedance 11.

A digital processing circuit 18 provides digital signals representative of the transmitted data.

The n-bit converter 16 is located in the regulation loop between the rectification means 12 and the control means 14. The converter 16 is preferably a single-bit converter (n=1), that may comprise a simple comparator. A very low resolution is thus obtained which minimizes the number of components, and that is compensated by a high resolution in time obtained by clocking the converter 16 at an over sampling frequency very much higher than the frequency of data transmitted by the fixed station 2.

For example, the over sampling frequency may be determined by a clock circuit outputting clock signals $C_k$ at a clock input to the converter 16. For example, for a data frequency of the order of 200 kHz, the over sampling frequency may advantageously be between 10 and 20 MHz.

Although the digital output signals from the converter 16 contain information necessary for the recovery of data transmitted by the fixed station 2, these digital signals are not directly useable.

Therefore, the output from the converter 16 connected to the control circuit 14 is connected to the input of a digital processing circuit 18 that will provide demodulated data on 1 bit.

Figure 5:
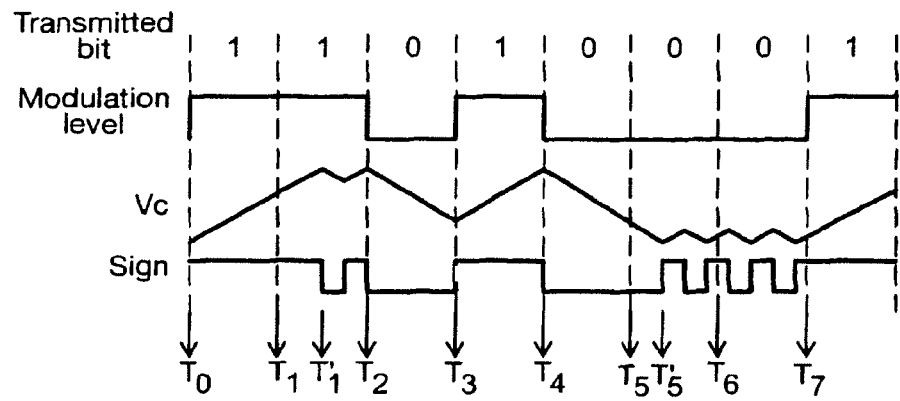
FIGS. 5 and 6 represent examples of operation with two levels according to the invention.

Operation of the demodulation circuit of the portable object in FIG. 4, is illustrated by signals shown in FIG. 5 in the case in which the low resolution analogue—digital converter 16 included in the regulation loop of the AC voltage Vac at the terminals of the antenna 10, consists of a simple comparator outputting a sequence of bits at the over sampling frequency. The control circuit 14 comprises an integrator outputting an analogue voltage signal Vc representative of the single-bit output signal from the converter 16.

Therefore, the digital output signal from the converter 16 contains information representative of the sign and the amplitude of the variation in the level of the emf generated by the field H, in other words information representative of the derivative of the envelope of the electromotive force or the magnetic field. Therefore the digital processing circuit 18 comprises at least one function to analyze the value and the sign of the derivative and a system to determine the value of the symbol.

Thus, the regulation loop in FIG. 4 simultaneously performs part of the analogue conversion which makes the assembly more compact. Furthermore, the effect of slow variations at the average magnetic field due to a movement of the portable object 1, is attenuated by the fact that the output information from the converter 16 is representative of the derivative of the envelope of the magnetic field. Therefore, slow variations in the average field are dealt with as noise and do not disturb demodulation.

We will describe an example of how the method according to the invention works, with reference to FIG. 5. This figure shows the transmitted symbols, the correction voltage $V_c$ and the sign signal that translates variations of $V_c$ for a system operating with a loop regulation time greater than the symbol time.

At $T_0$: station 2 emits a bit equal to 1, the regulation loop (voltage $V_c$) of the transponder 4 attempts to reach modulation level 1.

$T_1$, represents the end of the symbol; the regulation loop has not reached level 1, there is no change in level and therefore no change in the direction of regulation.

At time $T'_1$, level 1 is reached; the loop regulates around this level and changes direction regularly.

At $T_2$, a bit equal to 0 is controlled, and the loop attempts to reach level 0.

At $T_3$ a bit equal to 1 is controlled; although the loop has not reached level 0, it attempts to reach level 1.

At $T_4$ a bit equal to 0 is controlled; although the loop has not reached level 1, it attempts to reach level 0.

At $T_5$ a bit equal to 0 is controlled; the loop of the transponder 4 attempts to reach level 0.

At $T'_5$, level 0 is reached; the loop regulates around this level and regularly changes direction.

$T_6$ represents the end of the symbol, the next symbol is identical and the loop continues to regulate around level 0.

At $T_7$, a bit equal to 1 is controlled and the loops attempts to reach level 1.

Figure 6:
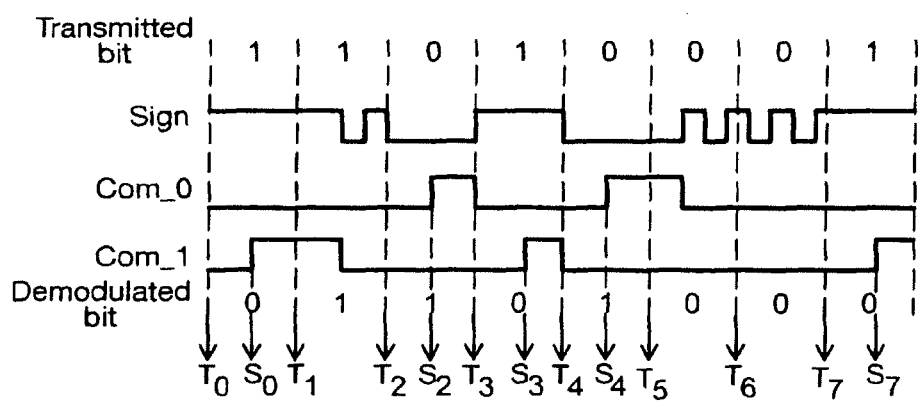

FIG. 6 illustrates operation of the system according to the invention.

The duration of a symbol is the time between $t_n$ and $t_{n+1}$, times Si represent the instants for which the length of a consecutive string of identical sign bits is greater than the detection threshold.

Com_0, signals the length of a string of "0" bits is greater than this threshold, and com_1 signals the length of a string of "1" bits is greater than this threshold.

The value of the detection threshold is determined by the maximum string length of identical consecutive sign bits when the control voltage is slaved around the set value given by the amplitude of the field.

For example, alternation of a string of "0" and "1" bits is approximately equal to time T6, the maximum string length when the control voltage is slaved is equal to 5 and the detection threshold can be fixed at 7, which gives a comfortable noise margin and a good demodulation result.

The value of the demodulated bit is not updated until the end of each symbol period, therefore the value of the demodulated bit between $T_n$ and $T_{n+1}$ corresponds to the value of the bit transmitted by the reader between $T_{n-1}$ and $T_n$.

At time To, the reader sends a bit equal to 1 (it is assumed that the bit was equal to 0 at To_1), the signed bit changes to 1 until the control voltage reaches the set value.

At time So, the length of string 1 reaches the detection threshold, therefore com_1 indicates that the reader has emitted a "1" starting from $T_0$, whereas the previous symbol was equal to "0".

Starting from $T_1$, the reader sends a "1"; the control voltage continues to attempt to reach the set value; com_1 remains active until an equilibrium is reached between the control voltage and the set value.

At time $T_2$, the reader sends a "0"; the sign bit is inverted and com_0 is activated in S2 indicating that a "0" string length greater than the detection threshold has been received.

At time $T_3$, the reader sends a "1", the sign bit is inverted and at S3 com_1 indicates that a string of "1" bits greater than the threshold has been received.

At time $T_4$, the reader sends a "0" and at S4 com_0 indicates that a string of "0" bits greater than the threshold has been received.

At time $T_5$, the reader emits a "0" and com_0 remains set until the control voltage is slaved to the set voltage.

At time T6, the reader sends a "0", no identical sign bit string greater than the threshold value is detected, com_0=com_1=0 signal that no bit change has been detected from the previous symbol.

Eventually, the series of symbols at the top of FIG. 5 (1 1 0 1 0 0 0) is obtained at the bottom of FIG. 6. Therefore, the proposed demodulation method for a two-level modulation works well.

According to the invention, deceleration of the regulation loop gives efficient demodulation with a very good signal to noise ratio. This deceleration is not a problem because, as already mentioned, the constraint on the regulation velocity does not exist in the case of a single-bit symbol. For example, the recovery time of the regulation loop may be greater than the symbol time.

The proposed digital demodulation makes it possible to efficiently use the output from a sigma delta converter 20 set as illustrated in FIG. 4 (between the input to converter 16 and an input to the digital processing circuit 18). This converter increases the resolution of the demodulation by reducing the influence of quantification noise generated by the converter 16.

FIG. 7 shows an example embodiment of a digital block 18 for a demodulation according to the invention.

It comprises:
- a block or means 30, for example a register, to memorize the sign bit,
- a comparison block or means 32, for example an "exclusive or", indicating changes to the sign bit,
- count means 34 or an "identical sign" string length counter. This counter is reinitialized during each transition of the sign signal;
- comparison means 36, or a comparator, indicating that the value of the counter is greater than the set value;
- two AND decoding blocks or means 38, 40, com_0 and com_1, such that:
  com_0=1 if counter>threshold and sign $(t_n)$=0
  com_1=1 if counter>threshold and sign $(t_n)$=1.
- a block or means 42 to decode com-0 and com-1 signals to determine the value of the decoded bit.

The decoding block 42 operates at the symbol frequency (ck-symbol), all other blocks operate at the over sampling frequency (ck-ech).

The decoding block 42 operates as follows:
com_0=1 →received bit=0
com_1=1 →received bit=1
com_0=com_1 →received bit identical to the previous bit.

A system according to the invention was produced with symbol durations of 9.44 μs, 4.72 μs, 2.36 μs and 1.18 μs and one bit per symbol (namely 2 levels). A simple and efficient transmission was obtained at 106, 212, 424 and 847 kbits/s respectively.

The invention claimed is:

1. Method for demodulating information emitted by amplitude modulation with two levels by a reader to a transponder, the method comprising:
   using a voltage regulation loop to generate a slaving voltage that is a function of a signal received by the transponder, the voltage regulation being a regulation on a voltage at terminals of a load impedance;
   determining a sign signal representing the variations of the slaving voltage, the sign signal taking a first or a second value depending on whether the slaving voltage is increasing or decreasing;
   checking, for each symbol, the hold time of the sign signal; and
   determining modulation level based on said checking.

2. Method according to claim 1, in which the hold time of the sign signal representing the variations of the slaving voltage of the transponder is compared with a threshold value.

3. Method according to claim 1, in which the value of a symbol is determined using the value of the previous symbol.

4. Method according to claim 1, in which, for each symbol, a sequence of sign bits at an over sampling frequency is provided, this sequence of sign bits being used to determine the value of each symbol.

5. Method according to claim 1, wherein:
   the hold time of the sign signal representing the variations of the slaving voltage of the transponder voltage is compared with a threshold value,
   the value of a symbol is determined using the value of the previous symbol,
   for each symbol, a sequence of sign bits at an over sampling frequency is provided, this sequence of sign bits being used to determine the value of each symbol, and
   when the sequence of sign bits for one symbol is an alternation of sequences from 0 and 1 bits for a duration less than the threshold value, then the value of this symbol is equal to the value of the previous symbol.

6. Method according to claim 1, wherein:
   the hold time of the sign signal representing the variations of the slaving voltage of the transponder voltage is compared with a threshold value,
   for each symbol, a sequence of sign bits at an over sampling frequency is provided, this sequence of sign bits being used to determine the value of each symbol, and
   when, for one symbol, the duration of an identical sign sequence is greater than the threshold value then the value of this symbol is determined according to the sign of this sequence.

7. Device for demodulating information emitted by amplitude modulation with two levels by a reader to a transponder, comprising:
   a voltage regulation loop configured to generate a transponder slaving voltage as function of a signal received by the transponder, the voltage regulation being a regulation on a voltage at terminals of a load impedance; and
   means to detect, for each symbol, a change of modulation level by checking the hold time of the sign signal translating the variations of the transponder slaving voltage, the sign signal taking a first or a second value depending on whether the slaving voltage is increasing or decreasing.

8. Device according to claim 7, in which the hold time of the sign signals representing the variation of a transponder slaving voltage is compared with a threshold value.

9. Device according to claim 8, comprising means of determining the value of a symbol using the value of the previous symbol.

10. Device according to claim 7, comprising means forming an antenna, load impedance means at the antenna terminals, and means forming a voltage regulation loop at the terminals of the load impedance.

11. Device according to claim 10, the means forming a voltage regulation loop comprising a rectifying circuit receiving the voltage at the antenna terminals, and control means to modify the load impedance as a function of the output from the rectification circuit.

12. Device according to claim 11, also comprising demodulation means comprising analogue-digital conversion means between the control means and the rectification means.

13. Device according to claim 11, comprising a comparator providing a sequence of bits at an over sampling frequency and an integrator outputting the transponder slaving voltage, the transponder slaving voltage being used to modify the load impedance.

14. Method for demodulating information emitted by amplitude modulation with two levels by a reader to a transponder, in which, for each received symbol, the following steps are implemented:
   determining if a sign signal representing the variations of a slaving voltage of the transponder has changed several times during the duration of the received symbol:
   if not, and if the sign signal representing the variations of the slaving voltage of the transponder is equal to a first value, then the value of the received symbol is equal to 1;
   if not, and if the sign signal representing the variations of the slaving voltage of the transponder is equal to a second value, then the value of the received symbol is equal to 0;
   if yes, and if the hold time of the sign signal representing the variations of the slaving voltage of the transponder is lower than a threshold value, then the value of the received symbol is equal to the value of a previous symbol;
   if yes, and if the hold time of the sign signal is greater than the threshold value and if the sign signal is equal to the second value, then the value of the received symbol is equal to 0;
   if yes, and if the hold time of the sign signal is greater than the threshold value and if the sign signal is equal to the first value, then the value of the received symbol is equal to 1.

15. Device for demodulating information emitted by amplitude modulation with two levels by a reader to a transponder, comprising:
   means for memorizing a sign bit of a received symbol;
   means for indicating changes to the sign bit of the received symbol;
   an "identical sign" string length counter;
   a comparator indicating if the value of the counter is greater or not than a threshold value;
   two means com_0 and com_1 whose values are determined such that:
      com_0=1 if the value of the counter is greater than the threshold value and if the value of the sign bit is equal to 0;
      com_1=1 if the value of the counter is greater than the threshold value and if the value of the sign bit is equal to 1;
   means for determining the value of the received symbol according to the values of com_0 and com_1 such that:
      if com_0=1, the value of the received symbol is equal to 0;
      if com_1=1, the value of the received symbol is equal to 1;
      if com_0=com_1=0, the value of the received symbol is equal to the value of a previous symbol;
   wherein the means for determining the value of the decoded bit operates at the symbol frequency and all other means of the device operate at an over-sampling frequency.

* * * * *